United States Patent
Lee et al.

(10) Patent No.: US 10,394,362 B2
(45) Date of Patent: Aug. 27, 2019

(54) ELECTRODE CONNECTION UNIT AND TOUCH SCREEN PANEL INCLUDING THE SAME

(71) Applicant: DONGWOO FINE-CHEM CO., LTD., Jeollabuk-do (KR)

(72) Inventors: Jin Koo Lee, Gyeonggi-do (KR); Ho Dong Yoon, Gyeonggi-do (KR); Byung Jin Choi, Incheon (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 27 days.

(21) Appl. No.: 15/946,872

(22) Filed: Apr. 6, 2018

(65) Prior Publication Data
US 2018/0224988 A1   Aug. 9, 2018

Related U.S. Application Data (63) Continuation of application No. PCT/KR2016/011122, filed on Oct. 5, 2016.

(30) Foreign Application Priority Data

Oct. 6, 2015   (KR) .................. 10-2015-0140445

(51) Int. Cl.
   *G06F 3/041*   (2006.01)
   *G06F 3/047*   (2006.01)
   *G06F 3/044*   (2006.01)
(52) U.S. Cl.
   CPC ........... *G06F 3/0412* (2013.01); *G06F 3/044* (2013.01); *G06F 3/047* (2013.01); *G06F 3/0416* (2013.01)

(58) Field of Classification Search
   None
   See application file for complete search history.

(56) References Cited

U.S. PATENT DOCUMENTS

| | | | |
|---|---|---|---|
| 2008/0105935 A1 | 5/2008 | Ogura et al. | |
| 2010/0264414 A1 | 10/2010 | Homma et al. | |
| 2016/0062512 A1* | 3/2016 | Ishizaki | G06F 3/044 345/174 |

FOREIGN PATENT DOCUMENTS

| | | |
|---|---|---|
| CN | 104238784 A | 12/2014 |
| KR | 10-2012-0067795 A | 6/2012 |
| KR | 10-2013-0053939 A | 5/2013 |
| KR | 10-2015-0051728 A | 5/2015 |

OTHER PUBLICATIONS

International Search Report for PCT/KR2016/011122.

* cited by examiner

*Primary Examiner* — Adam R. Giesy
(74) *Attorney, Agent, or Firm* — The PL Law Group, PLLC (57) ABSTRACT

An electrode connection unit includes an electrode connection unit body and a protective layer which covers at least a portion of an edge portion of the electrode connection unit body to satisfy a specific relation of area. An occurrence of cracks in the edge portions of the electrode connection unit body may be prevented when a bending stress is applied during a manufacturing process or treating a product.

10 Claims, 5 Drawing Sheets

ELECTRODE CONNECTION UNIT AND TOUCH SCREEN PANEL INCLUDING THE SAME

CROSS REFERENCE TO RELATED APPLICATIONS AND CLAIM OF PRIORITY

The present application is a continuation application to International Application No. PCT/KR2016/011122 with an International Filing Date of Oct. 5, 2016, which claims the benefit of Korean Patent Application Nos. 10-2015-0140445 filed on Oct. 6, 2015 at the Korean Intellectual Property Office, the disclosures of which are incorporated by reference herein in their entirety.

BACKGROUND

1. Technical Field

The present invention relates to an electrode connection unit and a touch screen panel including the same.

2. Description of the Related Art

Due to a rapid growth of technologies relating to image display devices in recent years, a flat panel display (FPD) such as a liquid crystal display (LCD), a field emission display (FED), a plasma display panel (PDP), an organic light emitting diode (OLED), and the like have been developed.

A flat display panel may be divided into a display part, and a non-display part surrounding the display part. The display part may include pixels defined by gate lines and data lines intersecting each other, and the non-display part may include a data pad and a gate pad which may be respectively formed at ends of the gate lines and the data lines, so as to transmit/receive an electrical signal to/from a driving device. The driving device may include a chip or a substrate for driving the flat display panel, for example, a driving integrated circuit (D-IC), a flexible printed circuit board (FPCB), etc.

However, in order to electrically connect the pads which are connected with electrodes of the touch screen panel or the image display device, with the D-IC or FPCB, the pads may be in contact with an anisotropic conductive film (ACF). While contacting the pads and the ACF each other, cracks may occur in the pads if a lower portion of the pads may be formed of a soft material.

Korean Patent Laid-Open Publication No. 2012-0067795 discloses a flat display panel including a first pad which protrudes from one side edge of an upper substrate while integrating signal lines formed on the upper substrate, and a second pad protruding from one side edge of a lower substrate while integrating signal lines formed on the lower substrate. However, any solution to overcome the above-described problem is not suggested in the patent document.

SUMMARY

Example embodiments of the present invention provide an electrode connection unit having an electrode connection unit body in which a protective layer is formed on a portion of the electrode connection unit body in a specific area ratio, so that cracks may be avoided or prevented.

Example embodiments of the present invention also provide an electrode connection unit which includes a conductive member adhered at a predetermined position above the electrode connection unit, thereby reducing an occurrence of bubbles during a fabrication, and an electrode connector including the same.

Example embodiments of the present invention provide a touch screen panel including the electrode connection unit.

Example embodiments of the present invention provide an image display device including the touch screen panel.

Example embodiments of the present invention provide an electronic device including the touch screen panel.

The above objects of the present invention will be achieved by the following features or constructions:

(1) An electrode connection unit comprising an electrode connection unit body and a protective layer which covers at least a portion of an edge portion of the electrode connection unit body to satisfy Equation 1 below:

$$0.2 \leq A'/A \leq 0.98 \quad \text{[Equation 1]}$$

wherein, in the Equation 1 above, A is a total area of the electrode connection unit body, and A' is an area of a portion which is not covered by the protective layer from the electrode connection unit body.

(2) The electrode connection unit according to the above (1), wherein the protective layers covering the edge portions are formed to face each other on the electrode connection unit body, and satisfy Equation 2 below:

$$W1-(W2+W2') \geq 30 \ \mu m \quad \text{[Equation 2]}$$

wherein, W1 is a width (μm) between opposite end portions of the electrode connection unit body, and is within a range of 50 to 250 μm, W2 is a width (μm) of a portion of one protective layer that covers one end portion of the electrode connection unit body in a width direction of W1, and W2' is a width (μm) of a portion of the other protective layer that covers the other end portion of the electrode connection unit body in the width direction of W1.

(3) The electrode connection unit according to the above (2), wherein a sum of the widths W2 and W2' is 2 μm or more.

(4) The electrode connection unit according to the above (1), wherein an end portion of the protective layer on the electrode connection unit body has a predetermined pattern.

(5) The electrode connection unit according to the above (1), wherein the electrode connection unit is configured to be connected with a conductive member so that the protective layers and a portion of the electrode connection unit body which is not covered by the protective layers are exposed, wherein the protective layers exposed from the conductive member and the electrode connection unit body which is not covered by the protective layers form an air vent hole.

(6) An electrode connector comprising the electrode connection unit according to any one of the above (1) to (5), and a conductive member which is connected to a surface of the electrode connection unit on which the protective layer is formed.

(7) The electrode connector according to the above (6), wherein the conductive member is connected to the electrode connection unit so that the protective layers and a portion of the electrode connection unit body which is not covered by the protective layers are exposed, Wherein the protective layers exposed from the conductive member and the electrode connection unit body which is not covered by the protective layers form an air vent hole.

(8) The electrode connector according to the above (7), wherein the conductive member is a flexible printed circuit board (FPCB).

(9) A touch screen panel comprising the electrode connection unit according to any one of the above (1) to (5).

(10) An image display device comprising the touch screen panel according to the above (9).

According to embodiments of the present invention, the electrode connection unit includes the electrode connection unit body and the protective layer formed on the edge portion of the electrode connection unit body with a specific area ratio, so that an occurrence of cracks in the edge portions of the electrode connection unit body may be prevented when a bending stress is applied during a manufacturing process or treating a product According to embodiments of the present invention, the electrode connection unit further includes the conductive member adhered thereto such that a portion of the electrode connection unit is exposed. Thus, an occurrence of bubbles at the adhered portion may be avoided during an adhesion process, and defects of the product may be reduced.

BRIEF DESCRIPTION OF THE DRAWINGS

The above and other objects, features and other advantages of the present invention will be more clearly understood from the following detailed description taken in conjunction with the accompanying drawings, in which:

FIGS. 2A to 4B are schematic views illustrating electrode connection units according to embodiments of the present invention.

DETAILED DESCRIPTIONS

Example embodiments of the present invention provide an electrode connection unit which includes an electrode connection unit body and a protective layer formed on at least a portion of an edge portion of the electrode connection unit body so as to satisfy Equation 1 relating to a specific area ratio, such that cracks in the edge portions of the electrode connection unit may be reduced or avoided even when a bending stress is applied during a subsequent process, and thereby decreasing a defect rate of products. Example embodiments of the present invention also provide an electrode connector, a touch screen panel and an image display device including the electrode connection unit.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

Display Region and Non-Display Region

Figure 1:
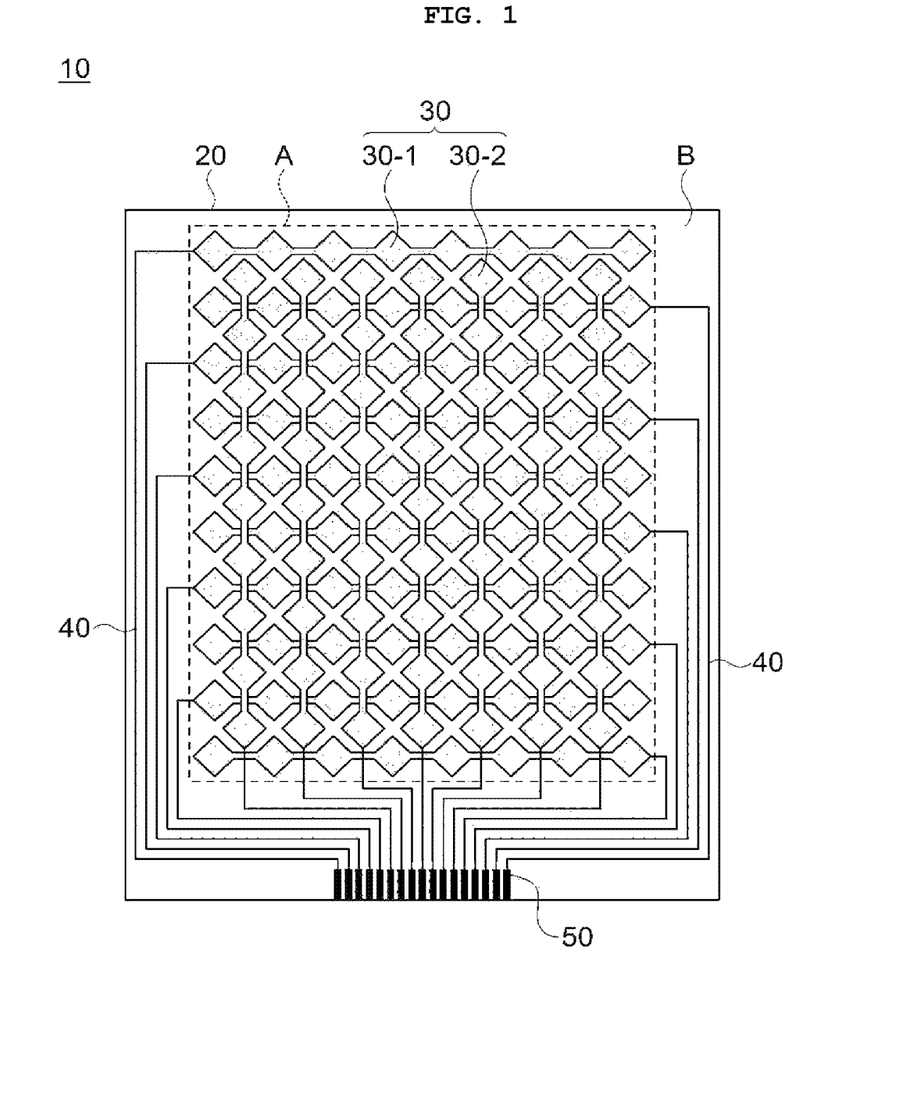
FIG. 1 is a plan view schematically illustrating an example of an electrode structure of a touch screen panel.

FIG. 1 is a plan view schematically illustrating an example of an electrode structure of a touch screen panel to which an electrode connection unit of the present invention is applied. Hereinafter, embodiments of the present invention will be described based on the touch screen panel, but the present invention is not particularly limited thereto.

Referring to FIG. 1, a touch screen panel 10 includes a display region A and a non-display region B. The display region A and the non-display region B may be formed on a transparent substrate 20. The display region A may be placed at a central portion of the touch screen panel 10, and the non-display region B may be placed at a peripheral portion (e.g., an edge portion) of the touch screen panel 10. Sensing electrode patterns 30 configured to sense an electrical or physical change by touch of a user may be formed in the display region A. Herein, the sensing electrode patterns 30 may include first sensing electrode patterns 30-1 and second sensing electrode patterns 30-2. The first sensing electrode patterns 30-1 and the second sensing electrode patterns 30-2 may be regularly formed in a rhombic shape to be adjacent to each other on the transparent substrate 20. In this case, the first sensing electrode patterns 30-1 may be formed on the transparent substrate 20 in a plurality of rows, and the second sensing electrode patterns 30-2 may be formed on the transparent substrate 20 in a plurality of columns.

Position detecting lines 40 and an electrode connection unit body 50 may be formed in the non-display region B. One end of the position detecting line 40 may be connected to each of the first sensing electrode patterns 30-1 formed in the plurality of rows and the second sensing electrode patterns 30-2 formed in the plurality of columns, and the other end of the position detecting line 40 may be connected to the electrode connection unit body 50. The electrode connection unit body 50 may be also connected with an external driving circuit.

In the present disclosure, the term "electrically connecting" means that the electrode connection unit body 50 is connected with the electrodes via wirings. The electrode connection unit body 50 may be formed with a wider area than that the wiring to improve reliability of an electrical connection.

However, when a lower member or material of the electrode connection unit body 50 is formed of a soft material, in the process of contacting the electrode connection unit body 50 with an anisotropic conductive film (ACF) or the like, the lower member may not endure an adherence pressure applied thereto to be bent and to result in cracks in the electrode connection unit body 50. For example, cracks may occur more easily at edge portions of the electrode connection unit body 50.

According to example embodiments of the present invention, a protective layer satisfying a predetermined area ratio parameter may be formed on the edge portion of the electrode connection unit body 50 to overcome the above-described problems.

Electrode Connection Unit

Figure 2A:
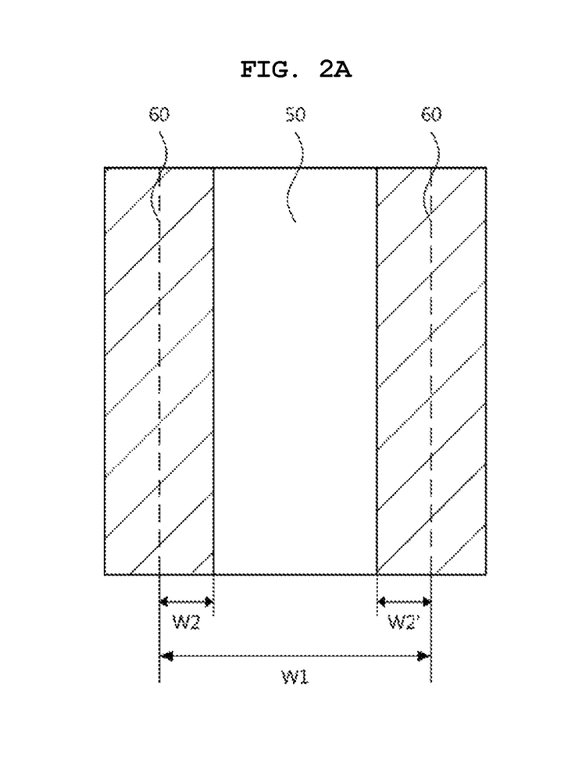
Figure 2B:
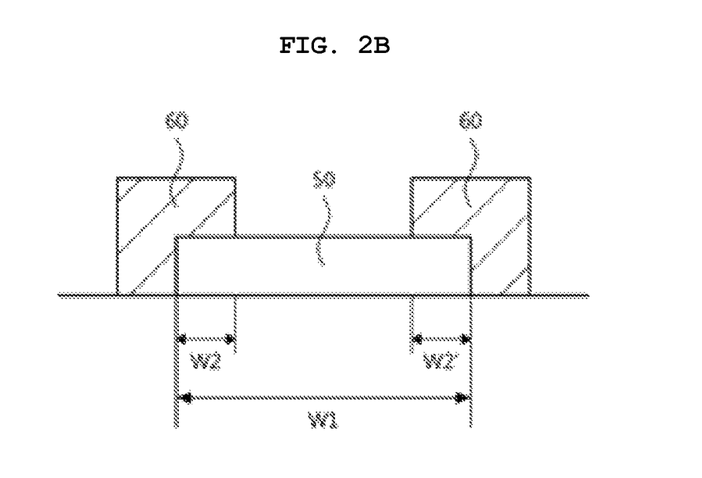

The electrode connection unit according to embodiments of the present invention includes the electrode connection unit body 50 and a protective layer 60 that covers at least a portion of an edge portion thereof so as to satisfy Equation 1 below (see FIGS. 2A and 2B):

$$0.2 \leq A'/A \leq 0.98 \qquad \text{[Equation 1]}$$

In the Equation 1 above, A is a total area of the electrode connection unit body, and A' is an area of a portion which is not covered by the protective layer from the electrode connection unit body.

In example embodiments, the protective layer 60 may be formed to cover the edge portion of the electrode connection unit body 50, thus to protect the edge portion of the electrode connection unit body 50. The protective layer may also serve as an insulation layer.

Equation 1 shows a range of the area ratio of a portion which is not covered by the protective layer 60 among the entire area of the electrode connection unit body 50. When the area ratio is within the range indicated by Equation 1, an electrical connection of the electrode connection unit body 50 may be effectively performed without decreasing conductivity, and the edge portion thereof may be protected. Therefore, a pressure applied to the electrode connection unit body 50 from an outside may be diffused to significantly reduce a generation of cracks in the electrode connection unit body 50.

If the area ratio of Equation 1 is less than about 0.2, a conductive member contact may not be sufficiently achieved, and if the area ratio thereof exceeds about 0.98, the electrode connection unit body 50 may not be sufficiently protected to cause cracks in the edge portion of the electrode connection unit body 50 when a bending stress is applied.

Preferably, the area ratio of Equation 1 may be in a range of 0.2 to 0.98, and more preferably, 0.3 to 0.95. The above-described effects may be more improved within the above range.

A shape of the electrode connection unit body 50 is not particularly limited so long as the protective layer is formed within the above area ratio, and may have various shapes such as a circular, polygonal shape, etc.

As illustrated in FIGS. 2A and 2B, the electrode connection unit body 50 according to one embodiment of the present invention may be formed in a rectangular shape. In this case, the protective layer 60 covering the edge portion thereof may be formed to face each other on the electrode connection unit body 50, and may satisfy a dimensional relationship with respect to the electrode connection unit body 50 represented by Equation 2 below.

$$W1-(W2+W2') \geq 30 \ \mu m \quad \text{[Equation 2]}$$

In the equation 2 above, W1 is a width (μm) between opposite end portions of the electrode connection unit body, which is in a range of about 50 to 250 μm. W2 is a width (μm) of a portion of one protective layer that covers one end portion of the electrode connection unit body in a width direction of W1. W2' is a width (μm) of a portion of the other protective layer that covers the other end portion of the electrode connection unit body in the width direction of W1.

Equation 2 shows the dimensional relationship defined by parameters of the widths between portions of the electrode connection unit body 50 covered by the protective layers 60, and a portion thereof which is not covered with the protective layer 60. When the dimensional relationship between the electrode connection unit body 50 and the protective layers 60 is within the range of Equation 2, the electrical connection of the electrode connection unit body 50 may be effectively performed without decreasing conductivity, and the edge portion thereof may be protected. Therefore, cracks in the electrode connection unit body 50 may be significantly reduced.

If the value of Equation 2 is less than about 30 μm, when adhering anisotropic conductive film (ACF) conductive balls to the electrode connection unit body 50, electrical properties may be deteriorated due to a poor adhesion of the ACF conductive balls. Preferably, the value of Equation 2 may be about 40 μm or more, and the above-described effects may be more improved within the above range.

In Equation 2, a sum of the widths W2 and W2' may be 2 μm or more. In this case, the above-described effects may be achieved, and the ACF conductive balls may be easily adhered to the electrode connection unit body 50 regardless of an error range in positions that may occur when connecting the conductive member.

Figure 3:
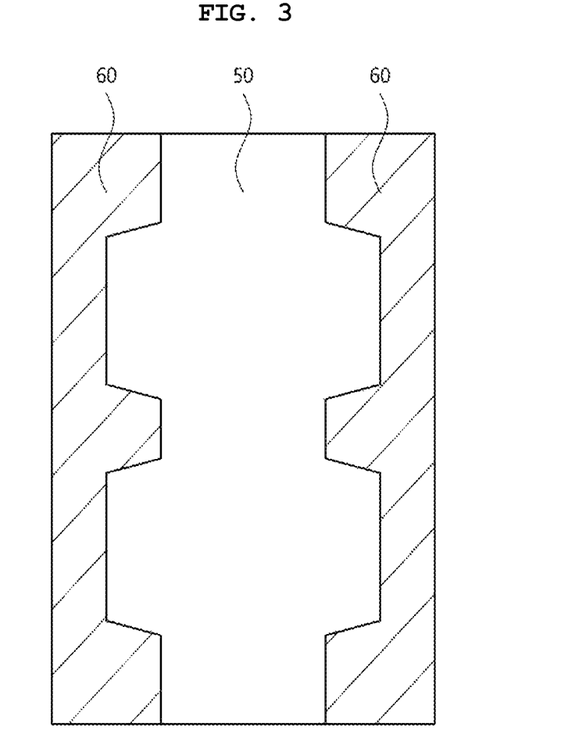

According to another embodiment of the present invention, the protective layer 60 may be formed to have a predetermined pattern. Referring to FIG. 3, end portions of the protective layers 60 on the electrode connection unit body 50 may be formed to have a predetermined pattern. The shape of the pattern is not particularly limited, but may be suitably selected according to, e.g., the shape of the conductive member to be connected.

According to another embodiment of the present invention, the electrode connection unit body 50 may be connected with a conductive member 70. In this case, referring to FIGS. 4A and 4B, the conductive member 70 may be connected with the electrode connection unit body 50 so that the protective layers 60 and a portion of the electrode connection unit body 50 which is not covered by the protective layer 60 are partially exposed, and the protective layer 60 exposed from the conductive member 70 and a portion of the electrode connection unit body 50 which is not covered by the protective layer 60 may define an air vent hole 80.

Figure 4A:
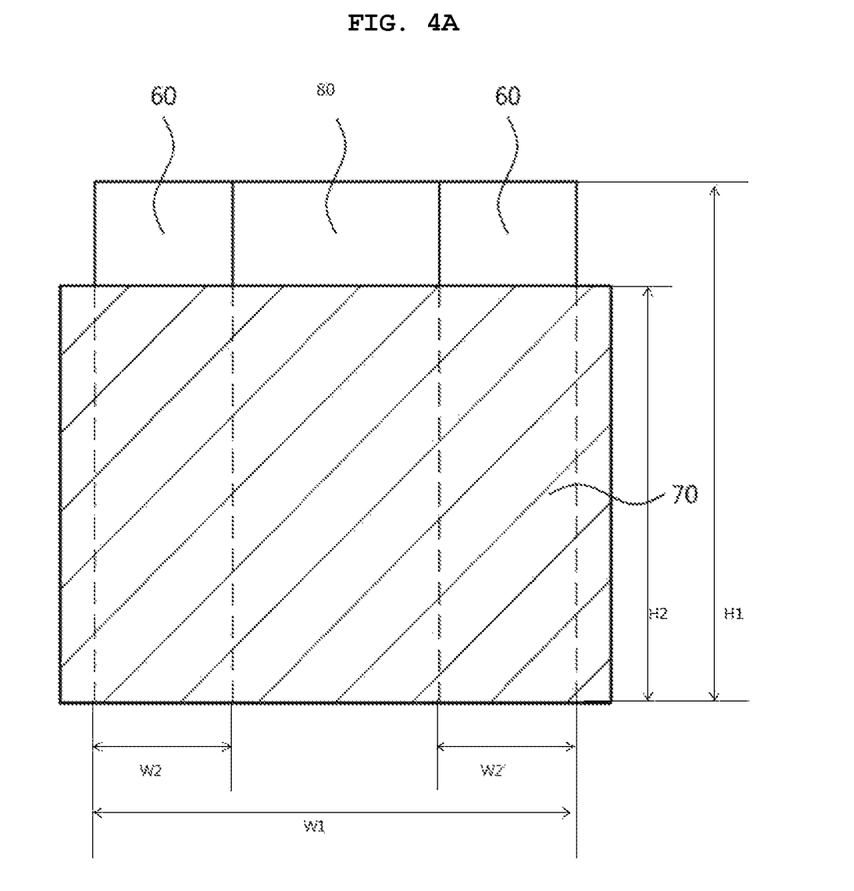
Figure 4B:
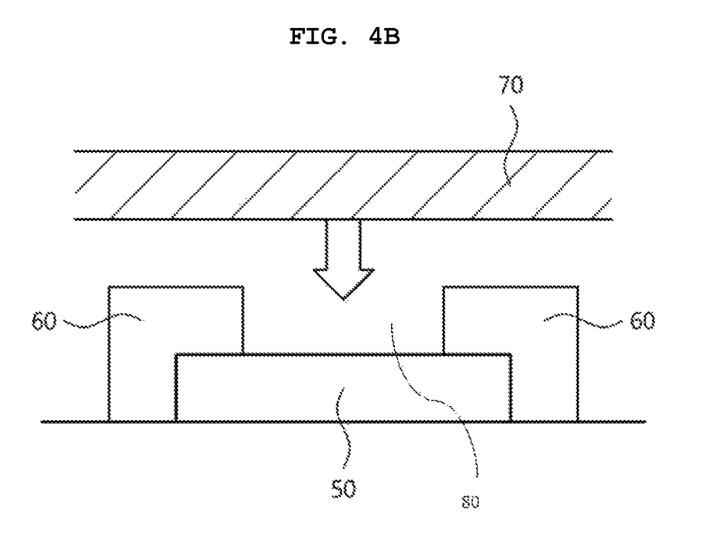

In example embodiments, the air vent hole 80 may be configured to release bubbles generated during a connection process of the conductive member 70, thus to decease defects caused by the bubbles.

The conductive member 70 may be configured to implement an electrical connection of the electrode connection unit body 50 with other parts, when the electrode connection unit body 50 according to example embodiments may be applied to, e.g., a touch screen panel, or the like. The other parts may include, e.g., a flexible printed circuit board (FPCB).

A material of the protective layer 60 may include any conventional material so long as it is commonly used in the related art without particular limitation thereof. For example, an inorganic insulating material such as silicon oxide, silicon nitride, etc., or an organic insulating material such as a photo-curable resin composition may be used.

A method of forming the protective layer 60 is not particularly limited. For example, silicon oxide or silicon nitride may be deposited in a predetermined pattern using a mask, or may be entirely deposited and then patterned by a dry etching process. The protective layer 60 may be formed by coating a photo-curable resin composition, and then performing exposing and developing processes to form a hole at an area for connecting the conductive member.

A material of the electrode connection unit body 50 may include any material so long as it has excellent electrical conductivity without particular limitation thereof. For example, the electrode connection unit body 50 may be formed of a material including at least one of a metal, a conductive metal oxide, or a conductive carbon.

The metal may include, e.g., silver (Ag), gold, aluminum, molybdenum, copper, chromium, neodymium and an alloy thereof. The conductive metal oxide may include, e.g., indium tin oxide (ITO), indium zinc oxide (IZO), Al-doped ZnO (AZO) and transparent conductive oxide (TCO), etc. The conductive carbon may include, e.g., a carbon nanowire, a carbon nanotube (CNT), graphene. These materials may be used alone or in a combination thereof.

According to one embodiment of the present invention, the electrode connection unit body 50 may include a metallic core part, and a conductive nonmetallic coating layer.

The metallic core part refers to a part formed of metal to implement the electrode connection unit body 50, and the conductive nonmetallic coating layer may prevent corrosion of the metallic core part. Herein, the metallic core part and the conductive nonmetallic coating layer may be formed in a single layer or a plurality of layers.

A conductive nonmetal may include the above-described conductive metal oxide and conductive carbon material. Examples of the conductive carbon material may include a carbon nanowire, a carbon nanotubes (CNT), graphene, etc., but it is not particularly limited thereto. These materials may be used alone or in a combination thereof.

Electrode Connector

Embodiments of the present invention provide an electrode connector including the electrode connection unit body 50 and the conductive member 70 which is connected to a surface of the electrode connection unit body 50 on which the protective layers 60 are formed.

As described above, the electrode connection unit body 50 includes the protective layer 60 that covers at least a portion of the edge portion thereof so as to satisfy Equation 1 relating to the area ratio, and the conductive member 70 (for example, the flexible printed circuit board) is adhered to the surface on which the protective layers 60 are formed to achieve an electrical connection.

According to one embodiment of the present invention, the conductive member 70 may be connected with the electrode connection unit body 50 so that the protective layers 60 and the portion of the electrode connection unit body 50 which is not covered with the protective layer 60 may be exposed, and the protective layer 60 exposed from the conductive member 70, and a portion of the electrode connection unit body 50 which is not covered by the protective layer 60 may define the air vent hole 80. Therefore, defects caused by bubbles at a connection area may be avoided or reduced.

The conductive member 70 that may be used in the electrode connector according to embodiments of the present invention may include a flexible printed circuit board (FPCB).

Touch Screen Panel and Image Display Device

Embodiments of the present invention also provide a touch screen panel including the electrode connection unit.

Elements and/or structures of the touch screen panel may include those commonly used in the related art. A lower substrate of the panel may include any material that may prevent cracks, e.g., a film, glass, plastic material, or the like. An upper protective layer may include an organic insulating film, an inorganic insulating film, an optical clear adhesive (OCA) film, an optical clear resin (OCR), or the like, without particular limitation thereof.

Further, embodiments of the present invention also provide an image display device including the touch screen panel. The image display device of the present invention may include various displays such as a liquid crystal display (LCD), field emission display (FED), plasma display panel (PDP), organic light emitting diode (OLED), flexible display, etc.

Hereinafter, preferred embodiments will be described to more concretely understand the present invention with reference to examples. However, it will be apparent to those skilled in the art that such embodiments are provided for illustrative purposes and various modifications and alterations may be possible without departing from the scope and spirit of the present invention, and such modifications and alterations are duly included in the present invention as defined by the appended claims.

EXAMPLES AND COMPARATIVE EXAMPLES

As illustrated in FIGS. 4A and 4B, electrode connection units were prepared by forming an acryl insulation layer in a structure as described in Table 1 below on opposite edge portions of the electrode connection unit bodies formed of Ag.

As illustrated in FIG. 4A, W1 is a width (μm) of opposite end portions of the electrode connection unit body. W2 is a width (μm) of a portion of one protective layer that covers one end portion of the electrode connection unit body in a width direction of W1. W2' is a width (μm) of the other protective layer that covers the other end portion of the electrode connection unit body in the width direction of W1. H1 is an entire length of the electrode connection unit body, and H2 is a length of a portion except for the air vent hole in the electrode connection unit body.

TABLE 1

| Section | W1 (μm) | W2 (μm) | W2' (μm) | Equation 2 | H1 (mm) | H2 (mm) | A (mm$^2$ * 100) | A' (mm$^2$ * 100) | Equation 1 |
|---|---|---|---|---|---|---|---|---|---|
| Example 1 | 200 | 80 | 80 | 40 | 1.6 | 1.5 | 30 | 6 | 0.2 |
| Example 2 | 200 | 50 | 50 | 100 | 1.6 | 1.5 | 30 | 15 | 0.5 |
| Example 3 | 100 | 15 | 15 | 70 | 1.6 | 1.5 | 15 | 10.5 | 0.7 |
| Example 4 | 100 | 5 | 5 | 90 | 1.6 | 1.5 | 15 | 13.5 | 0.9 |
| Example 5 | 100 | 35 | 35 | 30 | 1.6 | 1.5 | 15 | 4.5 | 0.3 |
| Example 6 | 100 | 30 | 30 | 40 | 1.6 | 1.5 | 15 | 6 | 0.4 |
| Example 7 | 100 | 25 | 25 | 50 | 1.6 | 1.5 | 15 | 7.5 | 0.5 |
| Comparative Example 1 | 200 | 90 | 90 | 20 | 1.6 | 1.5 | 30 | 3 | 0.1 |
| Comparative Example 2 | 200 | 1 | 1 | 198 | 1.6 | 1.5 | 30 | 29.7 | 0.99 |
| Comparative Example 3 | 200 | 85 | 85 | 30 | 1.6 | 1.5 | 22.5 | 4.5 | 0.15 |

Test Procedure

1. Evaluation of Crack Generation

Evaluation for crack generation in edge portions were executed under conditions described in Table 2 below using the electrode connection units manufactured in the examples and comparative examples, and results thereof are also listed in Table 2 below.

The term "edge portion" used herein means an area within 10 μm from the opposite ends of the electrode connection unit body.

It was investigated whether cracks occur or not in the same conditions ten times, the number of times when cracks occurred in the edge portions were summed up, and the evaluated results are listed in Table 2 below.

2. Evaluation for Electrical Connectivity with Conductive Member

Five pairs of ITO electrodes (ten electrodes) alternately arranged were connected to the electrode connection units prepared according to the examples and the comparative examples using position sensing lines, and the electrode connection units were adhered to a flexible printed circuit board (FPCB) such that protective layers and a portion of the electrode connection unit which was not covered by the protective layer were partially exposed, and then a sensor function test was performed under conditions described in Table 2 below to evaluate whether an electrical disconnection occurred or not.

For the ten electrodes adhered to the electrode connection units, the number of electrodes in which the disconnection occurred were summed up, and the results thereof are listed in Table 2 below.

TABLE 2

| Section | Condition for evaluating crack occurrence | | | Crack occurred | Disconnection occurred |
|---|---|---|---|---|---|
| | Load (Kgf) | Temperature (° C.) | Time (Second) | | |
| Example 1 | 5 | 155 | 10 | 0/10 | 1/10 |
| | 8 | 155 | 10 | 0/10 | 0/10 |
| Example 2 | 5 | 155 | 10 | 0/10 | 0/10 |
| | 8 | 155 | 10 | 0/10 | 0/10 |
| Example 3 | 5 | 155 | 10 | 0/10 | 0/10 |
| | 8 | 155 | 10 | 2/10 | 0/10 |
| Example 4 | 5 | 155 | 10 | 1/10 | 0/10 |
| | 8 | 155 | 10 | 4/10 | 0/10 |
| Example 5 | 5 | 155 | 10 | 0/10 | 4/10 |
| | 8 | 155 | 10 | 2/10 | 2/10 |
| Example 6 | 5 | 155 | 10 | 0/10 | 1/10 |
| | 8 | 155 | 10 | 2/10 | 0/10 |
| Example 7 | 5 | 155 | 10 | 0/10 | 0/10 |
| | 8 | 155 | 10 | 3/10 | 0/10 |
| Comparative Example 1 | 5 | 155 | 10 | 0/10 | 10/10 |
| | 8 | 155 | 10 | 0/10 | 8/10 |
| Comparative Example 2 | 5 | 155 | 10 | 8/10 | 0/10 |
| | 8 | 155 | 10 | 10/10 | 0/10 |
| Comparative Example 3 | 5 | 155 | 10 | 0/10 | 5/10 |
| | 8 | 155 | 10 | 0/10 | 4/10 |

Referring to Table 2, in the case of the examples which satisfy the relation of Equation 1 according to the present invention, it could be confirmed that occurrence of cracks was reduced when applying a bending stress during a manufacturing process, and an electrical connection of the electrode connection units was effectively achieved without a decrease in conductivity.

Meanwhile, in the case of Example 5 failing to satisfy the relation of Equation 2, the number of the disconnection was larger than other examples.

However, in the case of the comparative examples failing to satisfy the relation of Equation 1, the cracks and/or the electrical disconnection were significantly increased.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electrode connection unit, comprising:
an electrode connection unit body; and
a protective layer which covers at least a portion of an edge portion of the electrode connection unit body to satisfy Equation 1 below:

$$0.2 \leq A'/A \leq 0.98 \quad \text{[Equation 1]}$$

wherein, in the Equation 1 above, A is a total area of the electrode connection unit body, and A' is an area of a portion which is not covered by the protective layer from the electrode connection unit body.

2. The electrode connection unit of claim 1, wherein the protective layers covering the edge portions are formed to face each other on the electrode connection unit body, and satisfy Equation 2 below:

$$W1-(W2+W2') \geq 30 \ \mu m \quad \text{[Equation 2]}$$

wherein, W1 is a width (μm) between opposite end portions of the electrode connection unit body, and is within a range of 50 to 250 μm;
W2 is a width (μm) of a portion of one protective layer that covers one end portion of the electrode connection unit body in a width direction of W1; and
W2' is a width (μm) of a portion of the other protective layer that covers the other end portion of the electrode connection unit body in the width direction of W1.

3. The electrode connection unit of claim 2, wherein a sum of the widths W2 and W2' is 2 μm or more.

4. The electrode connection unit of claim 1, wherein an end portion of the protective layer on the electrode connection unit body has a predetermined pattern.

5. The electrode connection unit of claim 1, wherein the electrode connection unit is configured to be connected with a conductive member so that the protective layers and a portion of the electrode connection unit body which is not covered by the protective layers are exposed; and
the protective layers exposed from the conductive member and the electrode connection unit body which is not covered by the protective layers form an air vent hole.

6. An electrode connector comprising:
the electrode connection unit of claim 1; and
a conductive member which is connected to a surface of the electrode connection unit on which the protective layer is formed.

7. The electrode connector of claim 6, wherein the conductive member is connected to the electrode connection unit so that the protective layers and a portion of the electrode connection unit body which is not covered by the protective layers are exposed; and
the protective layers exposed from the conductive member and the electrode connection unit body which is not covered by the protective layers form an air vent hole.

8. The electrode connector of claim 7, wherein the conductive member is a flexible printed circuit board (FPCB).

9. A touch screen panel comprising the electrode connection unit of claim 1.

10. An image display device comprising the touch screen panel of claim 9.

* * * * *